Sept. 10, 1929. G. NAISMITH ET AL 1,727,898
FURNACE
Filed Dec. 12, 1927 3 Sheets-Sheet 3
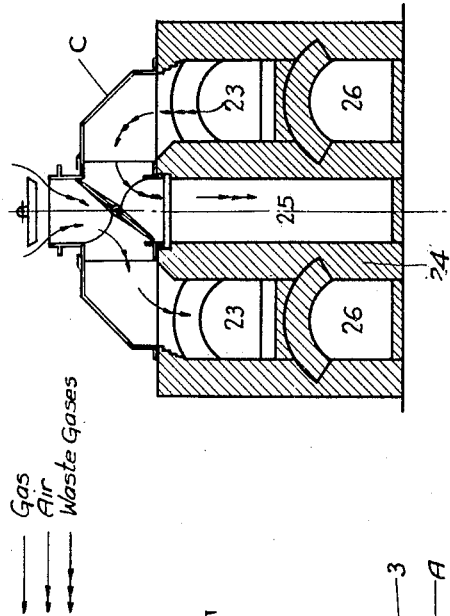
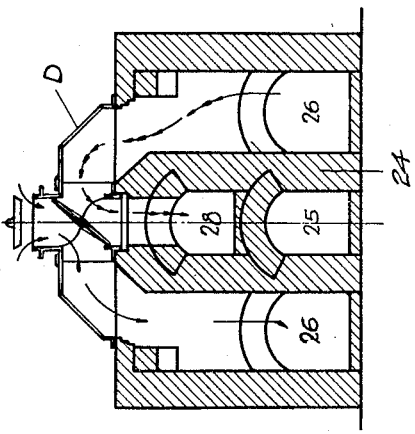
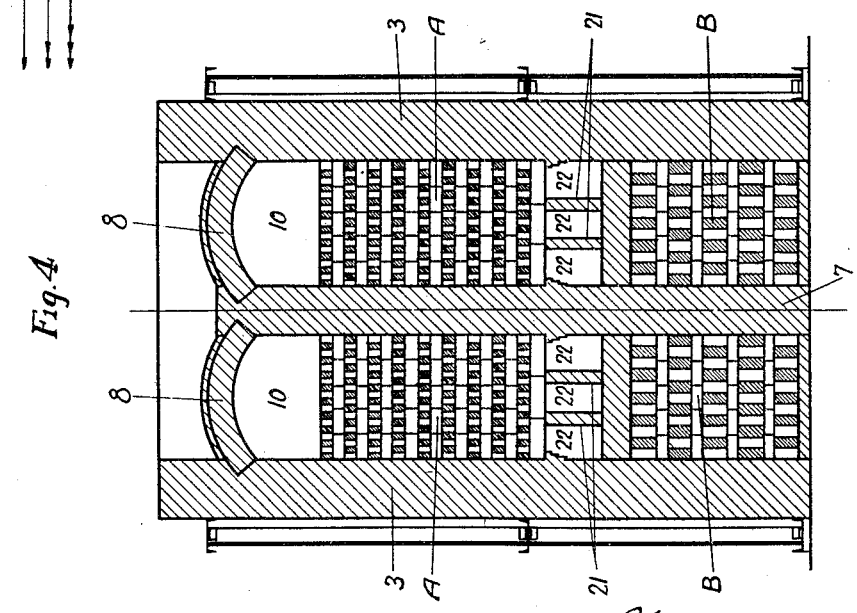
Inventors
George Naismith
Donald M. Naismith
By C. M. Clarke
Attorney Patented Sept. 10, 1929.

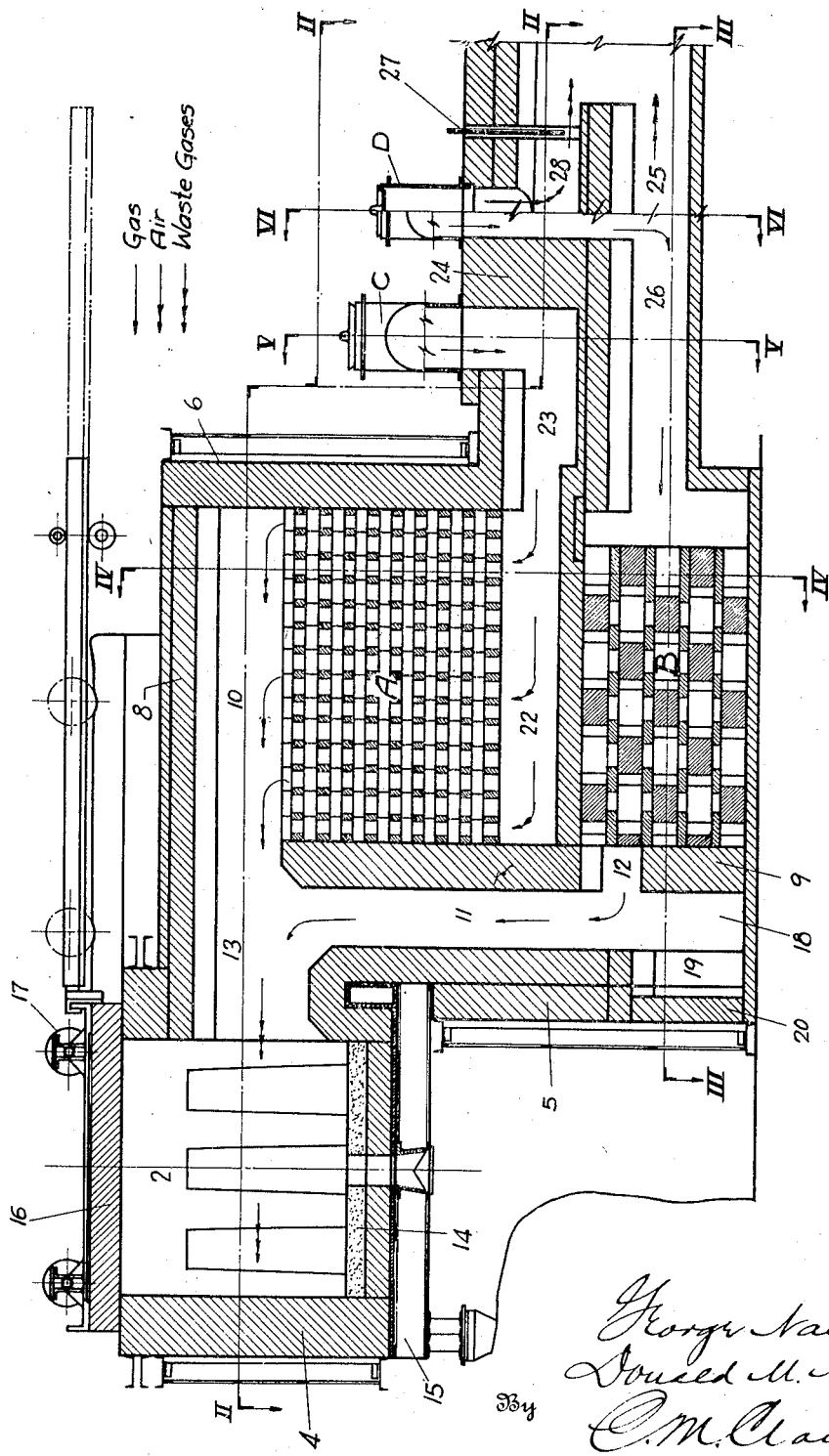

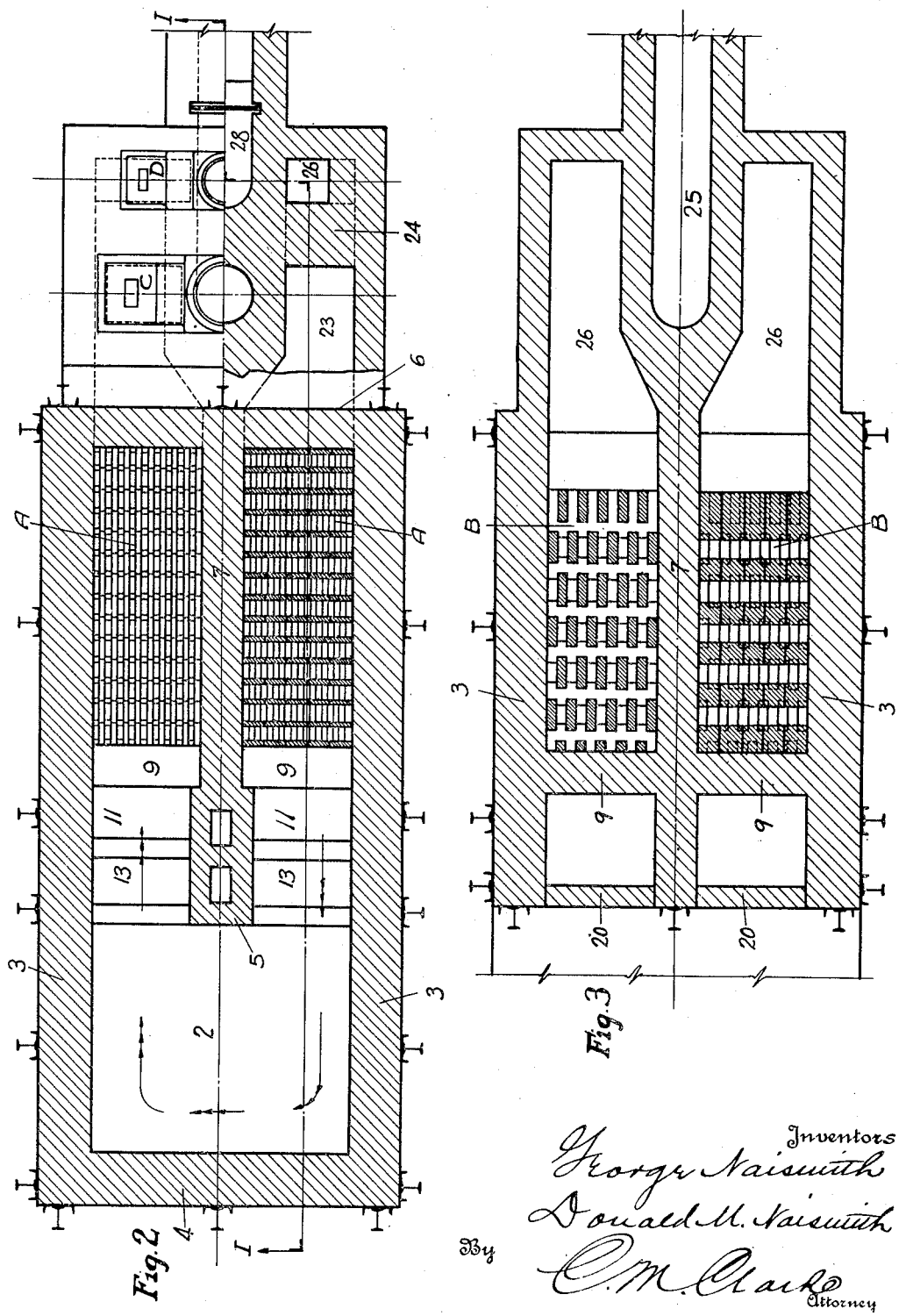

1,727,898

UNITED STATES PATENT OFFICE.

GEORGE NAISMITH AND DONALD M. NAISMITH, OF PITTSBURGH, PENNSYLVANIA.

FURNACE.

Application filed December 12, 1927. Serial No. 239,321.

Our invention is an improvement in heating furnaces of the regenerative type, particularly adapted to the heating of ingots and the like within a soaking pit or chamber.

It has in view to provide a regenerative furnace construction in which the fuel gases pass through pre-heating checkerwork arranged below air pre-heating checkerwork, with circulation through the furnace and return of the gases of combustion through correspondingly arranged checkerwork at the other side of a partition wall, with circulating ports, reversing valves, etc., as shall be more fully hereinafter described.

The heating chamber or soaking pit receives the incoming fuel gas and air in combustion at one side and discharges the waste gases at the other side of a furnace chamber, through which the gases circulate in an approximately horizontal annular path, alternating with each reversal of the valves, whereby the ingots etc. are exposed to the heating action at all times.

In the drawings showing one preferred embodiment of the invention:

Fig. 1 is a longitudinal vertical section through the furnace on the line I—I of Fig. 2;

Fig. 2 is a horizontal section, part plan view, on the double plane section line II—II of Fig. 1, showing the air pre-heating checkerwork in plan and section respectively;

Fig. 3 is a similar section on the line III—III of Fig. 1;

Fig. 4 is a vertical section on the line IV—IV of Fig. 1;

Fig. 5 is a vertical section on the line V—V of Fig. 1;

Fig. 6 is a vertical section on the line VI—VI of Fig. 1.

The soaking pit or heating chamber 2 of the furnace is of generally rectangular construction within side walls 3, 3, outer end wall 4 and inner transverse partition 5. The latter forms a partial closure of the heating chamber, forming the end wall of the regenerative portion of the furnace, which is also enclosed between the main side walls 3 and the opposite end wall 6.

A central partition wall 7 extends vertically from the base of the construction upwardly to the roof, forming a support for the arched roof coverings 8, 8, of the upper air regenerative chambers A and the common mixing and combustion chamber 13. These roof arches extend longitudinally from partition 5 to end wall 6.

Chamber A is arranged vertically above gas regenerative chamber B, both chambers A and B being preferably of equal width, and in duplicate arrangement, at opposite sides of partition 7, between the main end wall 6 and an opposite inner wall 9.

Wall 9 extends from the base upwardly to the top of the checkerwork in chambers A leaving an intervening space 10 for circulation of gases either from or to the checkerwork below the roof arches 8. Between walls 9 and 5 is a vertical port 11 communicating with the upper portion of gas chamber B by port 12, and such upwardly extending port 11 carries incoming heated gas for mixture with heated air in the common mixing, combustion and delivery channel 13.

Such channel is of substantially the same width as that of the checkerwork chambers A and B and leads into the furnace chamber 2 at one side, with a corresponding returning channel 13 at the opposite side, as in Fig. 2. Obviously, the circulation is reversed upon reversal of the valves according to the well known principle of operation of regenerative furnaces of the Siemens valve type.

As shown, the opposite inner surfaces of main side walls 3 are preferably continuous, avoiding any abutment or shouldered projections and facilitating circulation of the gases to and from the furnace chamber and with circulation therein, around and between the ingots.

The furnace chamber is provided with a suitable receiving and supporting floor 14 carried outwardly beyond the main wall 5 on a structural supporting platform 15, with suitable reinforcing buckstaves etc., as is usual in such construction. A removable cover 16 provided with carrying wheels 17 is adapted to be moved along a supporting trackway for opening and closing the furnace, as indicated in Fig. 1.

Any slag or other accumulation in the downwardly extended bottom portion 18 of port 11 may be removed through an opening 19 at the base of wall 5, having a suitable removable cover or door 20.

The checkerwork in chamber A extends upwardly above supporting walls 21 for the full length of the chamber, with intervening bottom circulation passages 22 communicating with the air supply port 23, at each side of the middle wall portion of the valve supporting structure 24, and with the reversing air circulation controlling valve C. By this arrangement the incoming air circulates vertically upward through the checkerwork A throughout its full extent.

The operation of said valve will be readily understood by those familiar with the art, supplying air alternately to one or the other of the air regenerative chambers A and with return of the waste gases from the other chamber to the outlet opening 25 leading to the stack.

The checkerwork in chamber A is preferably arranged as shown, providing a comparatively deep body of closely assembled alternating series of vertically arranged bricks, for very complete and thorough contact therewith of the incoming air for heating.

The gas supply entering the furnace through valve D passes from the valve through conduit or port 26 inwardly to the chamber B which is filled throughout its vertical height with the checkers laid vertically and horizontally, through which the gas passes in its progress toward the furnace in a continuously horizontal direction. The reverse circulation of waste gases passes from opposite conduit 13 downwardly through channel 11 and the checkerwork of both chambers and outwardly to the stack by conduits 25 and 28 as directed by the valves, as will be readily understood and as indicated in Figs. 1, 5 and 6.

A damper valve 27 is preferably located across extension port 28, leading to the stack, for control of the circulation thereto. By raising or lowering the damper valve the effect of the stack draft on the outgoing flue gases in the gas pre-heating checkerwork chamber B may be accurately regulated and controlled, in operating the furnace.

By the construction shown, we obtain the great advantage of close association of the side-by-side pairs of superimposed air and gas heating chambers, separated only by the wall 7. The circulation from one such pair passes directly to the inner side of the heating chamber 2 and reversely from the same side directly to and through the other pair.

The soaking pit chamber 2 extends beyond the main regenerative body of the furnace, and with the circulation provided, is always thoroughly and evenly heated from one side or the other in a consistently uniform and highly economical manner.

What we claim is:

1. A furnace having a heating chamber, a middle wall terminating at the inner side of the heating chamber, a lower gas pre-heating chamber and an upper air pre-heating chamber thereover at opposite sides of said wall, a common mixing, combustion and delivery conduit communicating with both chambers and with the inner side of the heating chamber at each side of said wall, means for supplying air and gas respectively to said pre-heating chambers, and means providing exhaust circulation for waste gases of combustion from the inner side of the heating chamber.

2. A furnace having main walls enclosing an endmost heating chamber, centrally divided air and gas pre-heating chambers communicating with the inner portion of the heating chamber at opposite sides thereof for incoming and outgoing circulation on a common horizontal plane, and having incoming and outgoing conduits communicating with the outer portions of the pre-heating chambers provided with controlling valves for alternating the circulation through said pre-heating chambers for incoming and outgoing circulation therethrough.

3. A furnace having main walls enclosing an endmost heating chamber, centrally divided chambers consisting of a lower gas pre-heating chamber and an upper air pre-heating chamber each communicating by a common conduit with the inner portion of the heating chamber at opposite sides thereof for incoming and outgoing horizontal circulation through the heating chamber, and supply and exhaust conduits communicating with the opposite end portions of the pre-heating chambers having controlling valves for reversing the circulation.

4. In a furnace having main walls enclosing an endmost heating chamber and side-by-side upper and lower pre-heating checkerwork chambers, said chambers comprising a lowermost horizontally circulating gas chamber and an upper vertically circulating air chamber in duplicate arrangement and communicating at each side with the inner portion of the heating chamber, and means for alternately supplying gas and air to said chambers at one side and withdrawing waste gases from the other side.

5. In a furnace having main walls enclosing an endmost heating chamber and side-by-side upper and lower pre-heating checkerwork chambers, a central dividing wall providing a common chamber width at each side with a common extension conduit therefrom leading to one side and the other of the inner portion of the heating chamber, transverse walls below and in the rear of the heating chamber providing intervening vertical flues communicating with each of said common conduits and with the lower pre-heating chamber at each side, a closing roof for each common chamber providing an upper circulating space communicating with the heating chamber, the vertical flue at each side and with the upper portion of each upper pre-heating chamber, a gas supply and return conduit leading directly to the rear of each preheating chamber, a final outlet conduit, and air and gas reversing valves for controlling the circulation to and from the pre-heating chambers.

6. In a furnace, the combination with side-by-side pairs of regenerative chambers consisting of a lower gas chamber and an upper air chamber, each pair having a common mixing, combustion and delivery conduit, with a middle longitudinal dividing wall and enclosing side walls, of an endmost heating compartment within an extension of the side walls and between an outer end wall and the end of the dividing wall in the horizontal plane of and communicating with the delivery conduits.

In testimony whereof we hereunto affix our signatures.

GEORGE NAISMITH.
DONALD M. NAISMITH.